United States Patent Office 3,055,742
Patented Sept. 25, 1962

3,055,742
SIMPLIFIED METHOD FOR MEASURING
PROTEIN-BOUND IODINE
Clayton H. Hamilton, North Central Medical Center,
First National Bank Bldg., Brainerd, Minn.
No Drawing. Filed Jan. 28, 1959, Ser. No. 789,487
9 Claims. (Cl. 23—230)

This invention relates generally to a method for determining the protein-bound iodine content of the blood, and more particularly it relates to a method of the character described in which the conversion of the iodine to a measurable form is greatly simplified over all previous similar methods.

In recent years, the determination of the protein-bound iodine in the blood has become an increasingly important and valuable aid to the medical profession, both diagnostically and as an indicator and guide of the effectiveness of various types of therapy. The reason for this growing importance is the fact that the protein-bound iodine represents substantially the amount of the hormone thyroxine which is present in the blood. Since this hormone is produced solely by the thyroid gland, a determination of the level thereof is obviously indicative of the health or functional state of the thyroid gland itself.

While various methods have been developed for the measurement of the protein-bound iodine, they have been characterized by numerous disadvantageous features. For example, to the applicant's knowledge, all of these prior methods are characterized by the fact that the iodine together with the protein to which the iodine is bound is first precipitated out of the sample of blood serum. This solid precipitate is then treated chemically in order to dissociate the iodine from the protein. Since the chemistry of the blood is quite complex, this method of chemically treating the protein to which the iodine is bound involves a number of time-consuming and complicated reactions which also provide a considerable source of error in the final determination.

It is therefore an important object of this invention to provide a method for measuring the protein-bound iodine in the blood in which the iodine is not precipitated from the blood but instead is retained in solubilized form in the supernatant serum from which the solid protein has been removed.

The actual measurement of the protein-bound iodine is invariably made with an optical density measuring device such as a colorimeter or spectrophotometer. Thus, the optical density of the treated unknown serum sample is compared with the optical densities of certain known standard solutions to obtain the actual iodine content. However, before such a comparative reading can be made, the iodine in the unknown sample must first be converted into the proper chemical form. This iodine compound generally must be a colorless, completely ionized and completely dissolved iodide salt. In the processes heretofore employed, this conversion of the protein-bound iodine after it had been precipitated out of the serum sample involved a complicated, time consuming and difficult chain of steps, both chemical and physical. In addition to a plurality of chemical reactions, this chain of steps generally included a difficult distillation stage. The distillation stage, in addition to being time consuming and difficult to perform, required intricate and expensive equipment and further afforded a source of substantial error in the final determination.

It is therefore another important object of the invention to afford a process of the character described in which the protein-bound iodine is initially converted to the desired iodide form so that all of the above described intermediate steps, including the distillation, are eliminated.

Another common feature of prior similar processes is the fact that it was necessary to boil one or more of the solutions during the various steps involved. Since some forms of iodine are readily volatile the use of heat again injected a source of possible error in the final determination.

Still another object therefore is to provide a process of the character described which does not involve the application of heat.

As has already been indicated, the prior similar processes often involved a great many steps. Obviously, the more steps required, the more time-consuming was each individual determination. Since these processes required the substantially complete attention of a trained person such as a doctor, laboratory technician or the like, a reduction in the time required is advantageous.

A further object therefore is to afford a process of the character described which may be performed in a substantially shorter period of time than was heretofore possible.

Still a further object is to provide a process of the character described in which the number of pieces of laboratory equipment required is greatly reduced. A related object is to provide such a process capable of being practiced with substantially less expensive equipment than heretofore used with consequent reduction in the cost of each determination.

Yet another object is to afford a process of the character described in which the number of chemical reagents is greatly reduced, again resulting in reduced cost.

Yet a further object is to provide a greatly simplified process requiring less highly skilled operators than heretofore necessary.

Another object is to afford a process of the character described which may be quickly, simply and inexpensively practiced, and yet achieves results which are at least as accurate as those obtained by prior similar processes.

With these and other objects in view which may appear as the description proceeds, the invention accordingly consists of the new process hereinafter fully described and discussed and from a consideration of which should result an understanding of the practice thereof and of the many advantages inherent therein.

According to a preferred embodiment of my new process, a protein-bound iodine determination is made in the following manner. A one (1) cc. sample of the unknown blood to be tested is placed into a centrifuge tube. Into said centrifuge tube are added 8 cc. of a first reagent and 1 cc. of a second reagent, said reagents having the following compositions.

First reagent:
    20 cc. concentrated sulphuric acid ($H_2SO_4$)
    2.5 gm. sodium chloride (NaCl)
    10 gm. arsenous oxide ($As_2O_3$)
    5 gm. sodium hydroxide (NaOH)
    Distilled water ($H_2O$) to make 1,000 cc. reagent Second reagent:
    10 gm. sodium tungstate ($Na_2WO_4$)·$2H_2O$
    Distilled water ($H_2O$) to make 100 cc. reagent The resulting solution is thoroughly mixed and allowed to stand for 3 minutes. The solution is then centrifuged at high speed for 4 minutes, and the supernatant fluid preserved while the precipitate is discarded.

The chemical reactions which probably occur during this first step are as follows:

The concentrated sulphuric acid in the first reagent dissolves or digests the protein in the blood sample thereby liberating into the solution, the iodine which had hitherto been organically bound to said protein. Said liberated iodine reacts with the sodium hydroxide to form the desired iodine form, sodium iodide. The presence of sodium chloride assures an adequate supply of sodium ions so that all of the iodine present will be reacted as described. The sodium tungstate of the second reagent reacts with the protein to form a solid which may be readily precipitated out of the solution by centrifugation. The arsenous oxide in solution with water forms the amphoteric hydroxide, $As(OH)_3$, whose function will become apparent as the description proceeds.

It will thus be noted that the iodine is retained in the supernatant fluid instead of being precipitated out with the protein as was heretofore the case in prior methods. It should be further noted that the iodine is already in the proper form for colorimetric measurement; namely the colorless and completely ionized sodium iodide. All of the previously described time-consuming, complex and error-introducing, chemical and physical steps heretofore required to convert the iodine into this form have thus been completely eliminated. And yet, this step of the invention may be performed in as little as seven (7) minutes.

In the next step 4 cc. of the above supernatant fluid, 1 cc. distilled water and 1 cc. of a third reagent are introduced into a colorimeter tube. The composition of this third reagent may be:

15 gm. ceric ammonium sulfate $(NH_4)_4Ce(SO_4)_4 \cdot 2H_2O$
50 cc. concentrated sulphuric acid $(H_2SO_4)$
Distilled water $(H_2O)$ to make 1,000 cc. reagent This solution is allowed to stand for twenty (20) minutes. The chemical reactions which take place during this step probably are as follows. The presence of the concentrated sulphuric acid causes the equilibrium of the amphoteric $As(OH)_3$ to shift so that the production of arsenous ions is favored. Although the ceric ion is highly colored in solution, the same is probably reduced by the arsenous ion to the colorless cerous ion. This reaction alone naturally reaches an equilibrium of ceric and cerous ions. However, iodine is a catalytic agent which increases the rate of reaction and shifts the equilibrium to favor the formation of the colorless cerous ion. Since this catalytic reaction is directly proportional to the amount of iodine present, it is thus possible to photometrically compare the unkown sample with known standards and thereby determine the amount of iodine actually present in the blood. In actual practice, the third reagent should not be added until the standard colorimeter tubes have been prepared as below described.

The standard colorimeter tubes are now prepared as follows. A working iodine standard is prepared by diluting 5 cc. of a fourth reagent with distilled water to make 100 cc. The fourth reagent may have the following composition:

130.8 mg. potassium iodide (KI)
Distilled water $(H_2O)$ to make 1,000 cc. reagent
(Equal to a concentration of 100 mcg. of iodine per cc.)

It will thus be seen that the working iodine standard has an iodine concentration of .05 mcg. per cc. or 5 mcg. percent per cc. Five colorimeter tubes are now prepared using the amounts of iodine standard and distilled water indicated in the table below:

| Tube | Blank | 5 mcg. Percent | 10 mcg. Percent | 15 mcg. Percent | 20 mcg. Percent |
|---|---|---|---|---|---|
| Iodine standard (cc.) | 0 | 1 | 2 | 3 | 4 |
| Distilled Water (cc.) | 4 | 3 | 2 | 1 | 0 |

Into each of the five tubes is added one cc. of the first reagent which furnishes a source of arsenous ions as already described. At 30-second intervals, one cc. of the third reagent is now added to each of the standard colorimeter tubes (from Blank to 20 mcg. percent) and is also added to the unknown sample. All six tubes are allowed to stand while the above described equilibrium reactions occur.

Twenty (20) minutes after the addition of the third reagent to the blank standard tube, the standard tubes are successively placed into the colorimeter and readings taken every thirty (30) seconds. These readings are then plotted on ordinary graph paper in which the co-ordinates comprise microgram percent and the actual colorimeter readings. When the five points are connected, they will form a parabolic-type curve. The unknown sample is now placed into the colorimeter, and its density read. Then by plotting this reading as the appropriate co-ordinate of the curve, the percent of iodine in micrograms may be determined as the other co-ordinate of the curve.

Of course, a plurality of determinations may be made simultaneously using the same standard curve, it being necessary only to add the third reagent and make the colorimeter readings at the proper intervals of time as indicated. In fact, I have found that one standard curve may be sufficient for a large number of determinations over a considerable period of time.

It is important to note that the actual protein-bound iodine reading is made directly when the density reading of the unknown is referred to the curve. This was not the case in prior methods where, due to the use of various additional reagents in the intermediate steps, it was necessary to prepare a reagent blank of such reagents and then to take a density reading thereof. This reading then was referred to the standard curve and the corresponding microgram percent reading thereof substracted from the microgram percent reading of the unknown to obtain the true protein-bound iodine content of the blood sample.

In other embodiments of the invention, the fourth reagent has been altered as follows and equally effective results obtained.

115.1 mg. sodium iodide (NaI)
Distilled water $(H_2O)$ to make 1,000 cc. reagent, or 168.5 mg. potassium iodate $(KIO_3)$
Distilled water $(H_2O)$ to make 1,000 cc. reagent It has been experimentally determined that the following ranges of ingredients may be effectively used in the first, second and third reagents, depending upon whether a high or low protein-bound iodine reading is indicated.

First reagent:
    2–100 cc. concentrated sulphuric acid $(H_2SO_4)$
    1–40 gm. sodium chloride (NaCl)
    2–20 gm. arsenous oxide $(As_2O_3)$
    2–40 gm. sodium hydroxide (NaOH)
    Distilled water $(H_2O)$ to make 1,000 cc. reagent Second reagent:
    1–30 gm. sodium tungstate $(Na_2WO_4) \cdot 2H_2O$
    Distilled water $(H_2O)$ to make 100 cc. reagent Third reagent:
    5–20 gm. ceric ammonium sulfate $$(NH_4)_4Ce(SO_4)_4 \cdot 2H_2O$$

1–150 cc. concentrated sulpuhuric acid $(H_2SO_4)$
    Distilled water $(H_2O)$ to make 1,000 cc. reagent It has likewise been determined that 5–20% trichloroacetic acid $(Cl_3C \cdot CO_2H)$ may be substituted for the sulphuric acid in the first reagent. Likewise, potassium chloride (KCl) may be substituted in lesser amounts for the sodium chloride in the first reagent. In either case, the potassium or sodium chloride may be added to the third reagent instead of the first.

It should thus be apparent that I have provided a new and improved method for determining the protein-bound iodine content of the blood. As described, many time-consuming and difficult steps heretofore required by prior methods have been eliminated resulting not only in a reduction of the costs but also in the number of sources of possible error. Hence accurate determinations are substantially assured. As a matter of fact in an experiment involving 100 separate determinations, my process was compared with another process of the type heretofore used, and in all cases, the results were at least as accurate. In many cases, the results achieved by my process were actually more accurate.

It should be further apparent that whereas prior methods required the use of as many as ten (10) different reagents, my complete method may be practiced with only four (4) reagents as described. Moreover, as was previously stated, the expensive, intricate special equipment heretofore required has been eliminated in my method so that only a conventional, relatively inexpensive and commonly used colorimeter and centrifuge is now necessary. Thus the exceptional simplicity of my method permits protein-bound iodine determinations to be readily made in every hospital or clinic, and even in the individual doctor's office. Heretofore, only the largest hospitals or specialized laboratories were properly equipped to make such determinations.

It should of course be understood that while the chemical reactions of my method have been theoretically explained, I do not wish to be limited by such theories, since the results obtained may or may not be explained thereby. Such explanation has been included only with the view of making the specification clearer and more complete, and is not intended in any way to limit the scope of the invention. It is my desire to secure the invention as pointed out in the appended claims regardless of the theory upon which it is based. It is believed that my invention in all its phases has been clearly set forth so that the practicing of the method should be readily understood without further description, and it should be manifest that the details of the method described are capable of wide variation within the purview of the invention as described in the specification and defined in the appended claims.

What I claim and desire to secure by Letters Patent of the United States is:

1. A method for measuring the protein-bound iodine content of the blood characterized by the steps of chemically treating a blood sample, precipitating the protein out of said sample, chemically treating the remaining supernatant fluid, and visually comparing said supernatant fluid with certain known standard solutions, said first chemical treatment comprising adding to said blood sample sulphuric acid, an alkali metal salt, arsenous oxide, an alkali metal hydroxide, sodium tungstate and water, said second chemical treatment comprising adding to said supernatant fluid a ceric salt, sulphuric acid and water.

2. The method of claim 1 in which said ceric salt comprises ceric ammonium sulfate.

3. The method of claim 1 in which said standard solutions comprise a plurality of solutions containing sulphuric acid, sodium chloride, arsenous oxide, sodium hydroxide, ceric ammonium sulfate, varying amounts of water and varying percentages of iodine.

4. The method of claim 3 in which said visual comparison comprises measuring the optical density of each of said standard solutions, plotting said optical densities on a graph in which the co-ordinates comprise said optical density measurements and said known percentages of iodine, preparing a standard curve from said standard density measurements, measuring the optical density of said supernatant fluid, and referring said supernatant fluid measurement to said standard curve to obtain the percentage of iodine contained therein.

5. A method for measuring the protein-bound iodine content of the blood characterized by the steps of adding a first and a second reagent to a blood sample, precipitating the protein out of said sample by centrifugation, adding a third reagent to the remaining supernatant fluid, and determining the iodine content by colorimetrically comparing said supernatant fluid with certain known standard solutions, said third reagent comprising 5–20 gm. ceric ammonium sulfate, 1–150 gm. concentrated sulphuric acid and sufficient distilled water to make 1,000 cc. thereof.

6. A method for measuring the protein-bound iodine of the blood characterized by the steps of: treating a one cc. sample of blood with 8 cc. of a first reagent containing 20 cc. concentrated sulphuric acid, 2.5 gm. sodium chloride, 10 gm. arsenous oxide, 5 gm. sodium hydroxide and sufficient distilled water to make 1,000 cc. of said first reagent; adding to said treated sample one cc. of a second reagent containing 10 gm. sodium tungstate and sufficient distilled water to make 100 cc. of said second reagent; centrifuging said mixture and discarding the precipitate produced; preparing 5 standard colorimeter tubes so that they each contain one cc. of said first reagent and 0 mcg. percent, 5 mcg. percent, 10 mcg. percent, 15 mcg. percent, and 20 mcg. percent of iodine respectively; adding at 30-second intervals to said colorimeter tubes and to four cc. of the supernatant fluid remaining from said centrifugation one cc. of a third reagent containing 15 gm. ceric ammonium sulfate, 50 cc. concentrated sulphuric acid and sufficient distilled water to make 1,000 cc. of said third reagent; successively inserting each of said standard colorimeter tubes into a colorimeter and taking the readings thereof; plotting said readings on a graph in which the co-ordinates comprise mcg. percent of iodine and colorimeter readings thereby forming a standard curve; taking the colorimeter reading of said supernatant fluid and referring said reading to said standard curve whereby the protein-bound iodine content of said blood sample is obtained.

7. The method of claim 6 in which said iodine concentrations of said standard colorimeter tubes are obtained by diluting 5 cc. of a fourth reagent with distilled water to 100 cc., said fourth reagent comprising 168.5 mg. potassium iodate and sufficient distilled water to make 1,000 cc. thereof, adding 0 cc., 1 cc., 2 cc., 3 cc. and 4 cc. of said diluted fourth reagent respectively to each of said tubes, and adding 4 cc., 3 cc., 2 cc., 1 cc. and 0 cc. of distilled water respectively to each of said tubes.

8. The method of claim 7 in which said fourth reagent comprises 115.1 gm. sodium iodide and sufficient distilled water to make 1,000 cc. thereof.

9. The method of claim 7 in which said fourth reagent comprises 130.8 mg. potassium iodide and sufficient distilled water to make 1,000 cc. thereof.

References Cited in the file of this patent

Fischl: Clinica Chimica Acta, vol. 1 (1956), pages 462–469.
Malkin: J. Lab. Clin. Med., 1956, vol. 48, pp. 124–126.
O'Neal: Am. J. of Clin. Path., 1953, vol. 23, pp. 493 to 505.
Leffler: Ibid., 1954, vol. 24, pp. 483 to 489.